United States Patent
Moss (10) Patent No.: US 9,119,387 B2
(45) Date of Patent: Sep. 1, 2015

(54) PEST CONTROL TRAP

(71) Applicant: METAMATRIX, LLC., Sagamore Hills, OH (US)

(72) Inventor: William R. Moss, Sagamore Hills, OH (US)

(73) Assignee: METAMATRIX, LLC., Sagamore Hills, OH (US)

( * ) Notice: Subject to any disclaimer, the term of this patent is extended or adjusted under 35 U.S.C. 154(b) by 0 days.

(21) Appl. No.: 13/957,161

(22) Filed: Aug. 1, 2013

(65) Prior Publication Data

US 2014/0013651 A1    Jan. 16, 2014

Related U.S. Application Data

(63) Continuation-in-part of application No. 12/772,842, filed on Mar. 12, 2010, now abandoned.

(51) Int. Cl.
*A01M 1/14* (2006.01)
*A01M 23/00* (2006.01)

(52) U.S. Cl.
CPC .............. *A01M 23/005* (2013.01); *A01M 1/14* (2013.01)

(58) Field of Classification Search
CPC ....... A01M 1/14; A01M 1/18; A01M 23/005; A01M 3/022
USPC .............. 43/114, 108, 115, 116, 58, 136; 428/357, 360–362, 375
See application file for complete search history.

(56) References Cited

U.S. PATENT DOCUMENTS

| | | | | |
|---|---|---|---|---|
| 203,336 A | * | 5/1878 | Greenman | 43/108 |
| 322,268 A | * | 7/1885 | Edge | 43/136 |
| 402,382 A | * | 4/1889 | Arents | 43/116 |
| 491,427 A | * | 2/1893 | Horton | 43/114 |
| 569,082 A | * | 10/1896 | Belknap | 43/108 |
| 569,083 A | * | 10/1896 | Belknap | 43/108 |
| 601,183 A | * | 3/1898 | Thum | 43/116 |
| 645,659 A | * | 3/1900 | Belknap | 43/108 |
| 662,603 A | * | 11/1900 | Belknap | 43/116 |
| 816,929 A | * | 4/1906 | Macauley | 43/116 |
| 822,735 A | * | 6/1906 | Gribbin | 43/116 |
| 916,106 A | * | 3/1909 | Clark | 43/108 |
| 1,108,870 A | * | 8/1914 | Arnold | 43/123 |
| 1,201,796 A | * | 10/1916 | Berg | 43/115 |
| 1,345,690 A | * | 7/1920 | Perl | 43/108 |
| 1,470,435 A | * | 10/1923 | Fowler | 43/136 |

(Continued)

FOREIGN PATENT DOCUMENTS

AM    2004081188 A    *    3/2004    ............ A01M 23/22
DE          3127234            1/1983

(Continued)

OTHER PUBLICATIONS

Product Sample of Real-Kill Household Pest Glue Boards, at least as early as the filing date of this application.

*Primary Examiner* — Darren W Ark
(74) *Attorney, Agent, or Firm* — Calfee, Halter & Griswold LLP (57) ABSTRACT

A rodent trap is provided having an entrapment pad formed of a nonwoven material substrate and a quantity of pressure sensitive adhesive of a rodent arresting quantity applied directly or indirectly through the substrate. The quantity of rodent arresting adhesive is sufficient to restrain movement of a rodent that becomes trapped in the entrapment pad.

13 Claims, 5 Drawing Sheets

(56) References Cited

U.S. PATENT DOCUMENTS

| | | | | |
|---|---|---|---|---|
| 1,760,820 | A * | 5/1930 | Drew | 428/153 |
| 2,022,937 | A * | 12/1935 | Kirkpatrick | 43/108 |
| 2,138,926 | A * | 12/1938 | Karfiol | 43/114 |
| 2,156,380 | A * | 5/1939 | Drew | 428/356 |
| 2,170,822 | A * | 8/1939 | Kirkpatrick | 43/108 |
| 2,177,627 | A * | 10/1939 | Drew | 428/352 |
| 2,201,643 | A * | 5/1940 | Casteel | 43/108 |
| 2,251,273 | A * | 8/1941 | Drew | 428/496 |
| 2,315,772 | A * | 4/1943 | Closs | 43/121 |
| 2,340,256 | A * | 1/1944 | Alex | 43/131 |
| 2,568,144 | A * | 9/1951 | Cremer et al. | 428/360 |
| 2,593,781 | A * | 4/1952 | Meis | 43/108 |
| 2,784,132 | A * | 3/1957 | Maisel | 428/360 |
| 2,900,291 | A * | 8/1959 | O'Connell | 428/360 |
| 2,911,756 | A * | 11/1959 | Geary | 43/114 |
| 2,962,836 | A * | 12/1960 | Hughes | 43/114 |
| 2,972,554 | A * | 2/1961 | Muskat et al. | 428/360 |
| 3,369,948 | A * | 2/1968 | Ostmann, Jr. | 428/361 |
| 3,617,417 | A * | 11/1971 | Olson | 156/181 |
| 3,864,866 | A * | 2/1975 | Kosinsky | 43/114 |
| 3,922,419 | A * | 11/1975 | Hammer et al. | 428/361 |
| 3,984,937 | A * | 10/1976 | Hamilton | 43/137 |
| 4,148,676 | A * | 4/1979 | Paquette et al. | 156/181 |
| 4,161,079 | A * | 7/1979 | Hill | 43/114 |
| 4,349,981 | A * | 9/1982 | Sherman | 43/114 |
| 4,425,731 | A * | 1/1984 | Orlando | 43/114 |
| 4,425,733 | A * | 1/1984 | Ammon et al. | 43/114 |
| 4,438,584 | A * | 3/1984 | Baker et al. | 43/114 |
| 4,541,199 | A * | 9/1985 | Reidinger, Jr. | 43/131 |
| 4,599,822 | A * | 7/1986 | Baker | 43/114 |
| 4,685,244 | A * | 8/1987 | Marks | 43/114 |
| 4,709,503 | A * | 12/1987 | McQueen | 43/114 |
| 4,805,340 | A * | 2/1989 | Becker et al. | 43/58 |
| 4,815,231 | A * | 3/1989 | McQueen | 43/114 |
| 4,908,976 | A * | 3/1990 | Dagenais | 43/121 |
| 4,917,714 | A * | 4/1990 | Kinsley, Jr. | 55/524 |
| 5,027,548 | A * | 7/1991 | Anderson | 43/131 |
| 5,175,956 | A * | 1/1993 | Hover et al. | 43/114 |
| 5,275,125 | A * | 1/1994 | Rotramel | 43/131 |
| 5,577,342 | A * | 11/1996 | Johnson et al. | 43/114 |
| 5,950,353 | A * | 9/1999 | Johnson et al. | 43/114 |
| 6,047,494 | A * | 4/2000 | Johnson et al. | 43/114 |
| 6,505,434 | B1 * | 1/2003 | Kloczko et al. | 43/114 |
| 6,598,337 | B2 * | 7/2003 | Ogram | 43/114 |
| 6,824,850 | B2 * | 11/2004 | Nourigat | 43/118 |
| 7,014,911 | B2 * | 3/2006 | Harris | 428/375 |
| 7,059,081 | B2 * | 6/2006 | Nourigat | 43/131 |
| 7,676,986 | B2 * | 3/2010 | Nelson | 43/114 |
| 8,215,051 | B2 * | 7/2012 | Alexander et al. | 43/108 |
| 8,250,803 | B1 * | 8/2012 | Kanno et al. | 43/114 |
| 2003/0186604 | A1 * | 10/2003 | Nourigat | 43/114 |
| 2004/0020104 | A1 * | 2/2004 | Feldhege et al. | 43/114 |
| 2004/0187377 | A1 * | 9/2004 | Gardner, Jr. | 43/114 |
| 2007/0157506 | A1 * | 7/2007 | Sadovski et al. | 43/114 |
| 2008/0016751 | A1 * | 1/2008 | Frisch | 43/58 |
| 2008/0289246 | A1 * | 11/2008 | van Bers | 43/114 |
| 2011/0302821 | A1 * | 12/2011 | Casagrande | 43/58 |
| 2013/0312313 | A1 * | 11/2013 | Lefkowitz et al. | 43/114 |

FOREIGN PATENT DOCUMENTS

| | | | | |
|---|---|---|---|---|
| DE | 3127234 | A1 * | 1/1983 | A01M 23/00 |
| EP | 79225 | | 5/1983 | |
| EP | 79225 | A2 * | 5/1983 | A01M 23/00 |
| GB | 2460432 | | 12/2009 | |
| GB | 2460432 | A * | 12/2009 | A01M 1/14 |
| JP | 57130901 | | 8/1982 | |
| JP | 57130901 | A * | 8/1982 | A01M 1/14 |
| JP | 04023936 | | 1/1992 | |
| JP | 04023936 | A * | 1/1992 | A01M 1/14 |
| JP | 05199830 | | 8/1993 | |
| JP | 05199830 | A * | 8/1993 | A01M 23/00 |
| JP | 06046728 | | 2/1994 | |
| JP | 06046728 | A * | 2/1994 | A01M 1/14 |
| JP | 08242744 | | 9/1996 | |
| JP | 08242744 | A * | 9/1996 | A01M 23/00 |
| JP | 09252704 | | 9/1997 | |
| JP | 09252704 | A * | 9/1997 | A01M 23/00 |
| JP | 10136863 | | 5/1998 | |
| JP | 10136863 | A * | 5/1998 | A01M 23/00 |
| JP | 10165069 | | 6/1998 | |
| JP | 10165069 | A * | 6/1998 | A01M 1/14 |
| JP | 10234284 | | 9/1998 | |
| JP | 10234284 | A * | 9/1998 | A01M 23/00 |
| JP | 11000092 | | 1/1999 | |
| JP | 11000092 | A * | 1/1999 | A01M 1/14 |
| JP | 11032647 | | 2/1999 | |
| JP | 11032647 | A * | 2/1999 | A01M 1/14 |
| JP | 11155457 | | 6/1999 | |
| JP | 11155457 | A * | 6/1999 | A01M 23/00 |
| JP | 2000253797 | | 9/2000 | |
| JP | 2000253797 | A * | 9/2000 | A01M 23/00 |
| JP | 2000325009 | | 11/2000 | |
| JP | 2000325009 | A * | 11/2000 | A01M 23/00 |
| JP | 2000325856 | | 11/2000 | |
| JP | 2000325856 | A * | 11/2000 | A01M 1/14 |
| JP | 2001136891 | | 5/2001 | |
| JP | 2001136891 | A * | 5/2001 | A01M 23/00 |
| JP | 2001204359 | | 7/2001 | |
| JP | 2001204359 | A * | 7/2001 | A01M 23/00 |
| JP | 2001352888 | | 12/2001 | |
| JP | 2001352888 | A * | 12/2001 | A01M 1/14 |
| JP | 2003000131 | | 1/2003 | |
| JP | 2003000131 | A * | 1/2003 | A01M 23/00 |
| JP | 2004081188 | | 3/2004 | |
| JP | 2006174787 | | 7/2006 | |
| JP | 2006174787 | A * | 7/2006 | A01M 23/00 |
| JP | 2006254716 | | 9/2006 | |
| JP | 2006254716 | A * | 9/2006 | A01M 1/14 |
| JP | 2007104918 | | 4/2007 | |
| JP | 2007104918 | A * | 4/2007 | A01M 23/00 |
| JP | 2007-228827 | | 9/2007 | |
| JP | 2007228827 | A * | 9/2007 | A01M 23/00 |
| WO | 2005/079568 | | 9/2005 | |
| WO | WO 2005079568 | A1 * | 9/2005 | A01M 23/00 |

* cited by examiner

PEST CONTROL TRAP

CROSS-REFERENCE TO RELATED APPLICATION

This application is a continuation-in-part of U.S. Non-Provisional Patent Application Ser. No. 12/722,842, entitled PEST CONTROL TRAP and filed Mar. 12, 2010, the entire disclosure of which is incorporated herein by reference.

BACKGROUND

Recently, the use of nonwovens has become increased in many areas, such as with disposable diapers and disposable cleaning devices such as, for example, treated wipes. Such products are often sold as clean or sterile items, either dry or with liquid ingredients absorbed therein. Some of these are formed from spunlaced, airlaid, and other methods, and are sold as either dry wipes intended for dust or lint removal or wet wipes are saturated with various liquids. As these non-woven substrates are used, they become soiled, abraded, torn, or clog up, or the liquid becomes depleted, in which case they are disposed of.

To date, the use of high loft nonwovens have not been used in the field of pest control traps. The most widely used pest traps consist of mechanical traps, or adhesive traps. Mechanical traps which use stored kinetic energy to enclose or crush the rodent, capture the insect or similar pest, and have the advantage of retaining the dead pest at a specific site for disposal. However, the moving parts of a mechanical trap add to the cost of manufacture. Adhesive devices have been developed which present an expanse of highly retentive adhesive along a path frequented by rodents. A rodent making contact with the adhesive will be held and prevented from departure. Eventually the rodent will become suffocated in the adhesive, or will otherwise die. The glue-containing board and dead rodent may then be disposed of as a single unit.

The costs of convenience in glue boards are of great concern. The adhesive nature of the device means that it must be shielded from contact with dirt and debris prior to use, lest its adhesive properties be reduced. Furthermore, for convenience to the user, the adhesive should be shielded from contact with clothing, hands, furniture, etc., until ready to be placed along a rodent runway.

Figure 1:
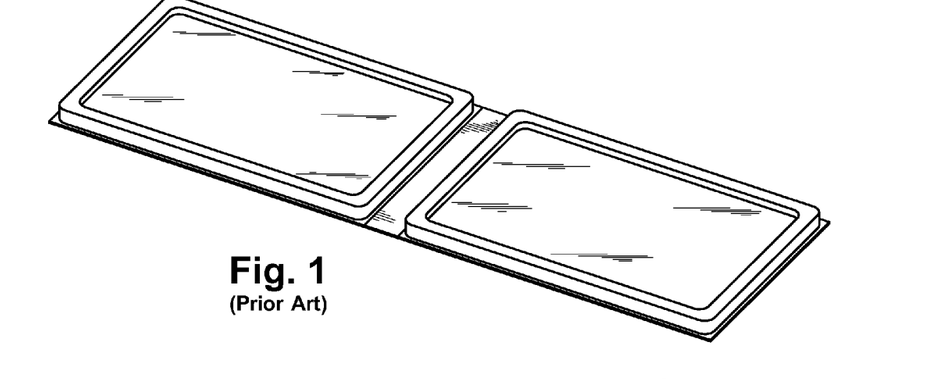
FIG. 1 is a photograph of a perspective view of a glue board rodent trap according to the PRIOR ART.
Figure 2A:
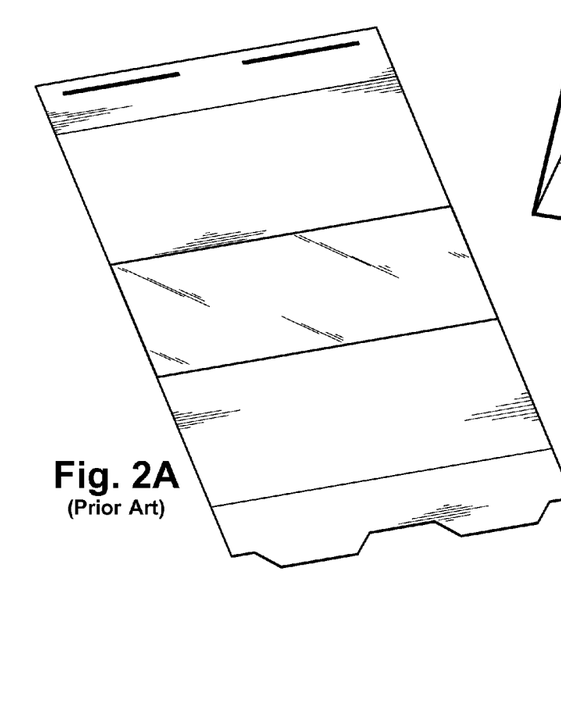
FIG. 2a and FIG. 2b are photographic perspective views of a glue board insect trap, shown disassembled and assembled respectively, according to the PRIOR ART.
Figure 2B:
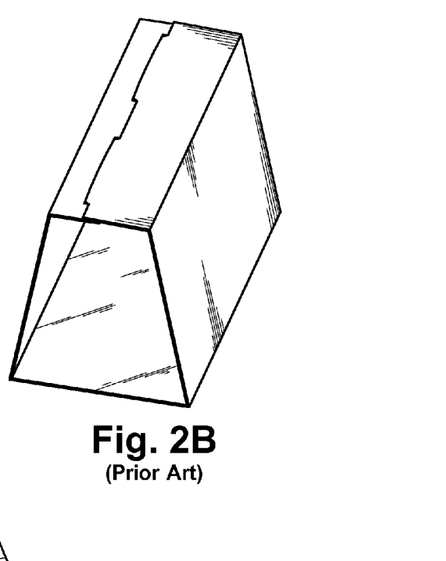

Prior art glue boards such as shown in FIG. 1, have employed thermoformed plastic trays to contain the adhesive, usually a hot melt adhesive of sufficient adhesion as to capture a rodent that may stumble upon the tray and immobilize or otherwise retain the capture rodent thereon. However, these traps and glueboards have an efficacy that is limited due to the locations available for placement relative to where the rodents are actually traveling. Rodents may run up and down vertical pipes between building levels as well as running on structural I-beams and horizontal electrical conduits. The prior art glueboards require the use of a sufficient area of adhesive surface in order to provide an effective capture area to prevent a rodent "leveraging" itself loose. To properly capture a rodent, the body and extremities must be entrapped, lest the rodent become able to work itself free. Some prior art glue boards may have other restrictions on geometry as well, such as for example, needing to be placed horizontal. For example, glue boards using a hot melt adhesive may require horizontal placement to prevent a loss of any pool of melted adhesive occurring when ambient temperature exceeds hot melt flow temperature. Similar PRIOR ART pest control devices, such as shown in FIG. 2a-2b, targeting smaller pests like insects use cardboard or similar substrate in place of the plastic tray.

SUMMARY

It has now been found that inert fibers, web forming non-woven substrate fibers or pad or particularly those having low to high loft characteristics, can be provided with unique properties, by distributing a pressure sensitive adhesive active ingredient directly or indirectly throughout and across the substrate fibers, matrix, or pad pre-treated with such adhesive.

A broad aspect of the invention is the incorporation of pressure sensitive adhesive in a web material. The term "high loft" has a standard definition in the art, to indicate large pore web material. An aspect of the present invention is not as concerned with the relative size of the pores of the web but rather their use as a substrate for containing the adhesive on the fibers and within the pores.

Another broad aspect of the invention relates to a mechanism for incorporating pressure sensitive adhesives into the pore structure of an open pore structure, such that the adhesives do not migrate out of the web structure. In a preferred embodiment of the invention, the porous material is web structure, and in other embodiment the porous material is any open pore structure, such as an open cell foamed plastic.

In one embodiment of the invention, a pest trap offers progressively increasing adhesion contact as a pest advances from a top surface of the trap toward a bottom surface, requiring progressively more force to free the rodent from the trap.

BRIEF DESCRIPTION OF THE DRAWINGS

Features and advantages of the general inventive concepts will become apparent from the following detailed description made with reference to the accompanying drawings.

DETAILED DESCRIPTION

This Detailed Description merely describes exemplary embodiments in accordance with the general inventive concepts and is not intended to limit the scope of the invention or the claims in any way. Indeed, the invention as described by the claims is broader than and unlimited by the exemplary embodiments set forth herein, and the terms used in the claims have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing quantities of ingredients, properties such as molecular pressure source, reaction conditions, and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

In order to describe the complete relationship of the invention, it is essential that some description be given to the manner and practice of functional utility and description of several terms before describing the invention. It should be appreciated that the following definitions are used throughout this application. Where the definition of terms departs from the commonly used meaning of the term, applicant intends to utilize the definitions provided below, unless specifically indicated.

The present invention addresses the problems associated with the prior art and provides for a glueboard and a method of using the glueboard for trapping rodents or other pest on various surfaces while using a smaller adhesive mass.

For the purposes of the present invention, the term "adsorb" or "adsorbed" refers any method of accumulation of a substance on a surface, including but not limited to soaking up a liquid or the formation of a layer of atoms or molecules of a substance, on the surface of a solid or liquid.

For the purposes of the present invention, the terms "active ingredient" refers to a bait mechanism to attract a target pest through the use of pheremone, scent, food source, or other compound or mixture that functions to stimulate the target pest through sight, sound, smell, or other stimulation of any senses individually or in combination.

For the purpose of the present invention, the term "cellular structure" refers to the spaces, both surface and interior, between the fibers forming the substrate.

For the purposes of the present invention, the terms "open pore" and "open cell" can be used interchangeably with the term to indicate the space within a cellular structure.

For the purpose of the present invention, the term "pressure sensitive adhesive" refers to any ingredient or compositions of ingredients that can be used to dip, tumble, spray or otherwise coat individual fibers, crossovers and cellular structures of any fibers, nonwoven, etc. pad. These ingredients cause the fibers to become coated with pressure sensitive adhesive, never completely drying. Pressure sensitive adhesives can be water borne, solvent born, or hot melt, and all such adhesives can be modified so as to increase strength and tack and other rheological properties. To do so, tackifiers, among other ingredients, can be added to the adhesive to change their adhesive properties. The critical feature to any of the pressure sensitive adhesive or adhering substance is that they tend to remain pressure sensitive and do not chemically change to a non-pressure sensitive adhesive unless contaminated by combining with oxygen, UV light, or other airborne ingredients, such as dust, to render the pressure sensitive adhesive non-pressure sensitive. As used herein, synonymous names are: adhesion agent, tack agent, cling substance, cling agent, tack substance, tack agent, tackifier, adhering substance adhering agent, active adhering agent.

For the purpose of the present invention, the term "fiber" refers to a unit of matter, either natural or manufactured, that forms the base element of a fabric and/or other structures. A fiber is characterized by having a length at least 100 times its diameter or width. The term refers to units that can be spun into a yarn or used individually to be made into a fabric or other structure by various methods including, but not limited to, weaving, knitting, braiding, felting and twisting. The term "filament" is used herein interchangeably with the term "fiber."

For the purposes of the present invention, the term "highloft" refers to a term for a fiber structure containing more air than fiber. That is, the volume of the open cells represents more than half of the volume of the fiber structure. Specifically, a lofty, low density non-woven structure that is used for applications such as fiberfill, insulation, health care, and water filtration, personal protection and cleaning materials. These materials are 'usually produced using a wet or dry air laid forming process among others such as melt blown or needle punched.

For the purposes of the present invention, the term "horizontal rows" refers to rows of any number of active ingredients that extend horizontally starting along the proximal surface of the substrate for a predetermined depth and continuing toward the distal surface of the substrate for a predetermined number of rows. These rows can have any depth applicable to the end use and do not necessarily have to end completely from surface to surface.

For the purposes of the present invention, the term "pressure sensitive adhesive" refers to compositions that function in any manner as a permanent pressure sensitive adhesive. While a person having ordinary skill in the relevant art would equate the term "pressure sensitive adhesive" with a high viscosity pressure sensitive adhesive that flows when heated and becomes rigid when cooled to room temperature or operating temperature, for purposes of the present invention it is intended that the term "pressure sensitive adhesive" may be expanded to incorporate any chemical, element, composition, or mixture of any phase that can be applied to or retained by the fibers or pores or otherwise constrained within the highloft, such as in using a water or solvent borne pressure sensitive adhesive and removing the carrier (e.g. drying).

For the purposes of the present invention, the term "patchwork" refers to predetermined sections of any number of active ingredients that extend from the proximal surface toward the distal surface of the substrate. These sections can be any size applicable to the end use and can have different active ingredients adjacent to one another.

For the purpose of the present invention, the term "pest" refers generally to a pest targeted for capture or restraint or otherwise eliminated. While a person having ordinary skill in the relevant art would equate the term "pest" with a rat, mouse, gopher, mole or other rat-like or mouse-like mammal or marsupial vermin, for purposes of the present invention it is intended that the term "rodent" be used exemplary and not as a limitation and to include flying or crawling insects, arachnids, reptiles, amphibians or any other pest targeted for capture or restraint or elimination. It will become obvious to a person having ordinary skill in the relative art, with the hindsight of the present teachings, that the features and benefits taught herein may subsequently be adapted for uses extending from the exemplary field of pest traps.

For the purposes of the present invention, the term "vertical rows" refers to rows of any number of active ingredients that extend from the proximal surface toward the distal surface of the substrate. These rows can have any width applicable to the end use and do not necessarily have to end completely from surface to surface.

For the purposes of the present invention, the term "nonwoven" refers to an assembly of entangled synthetic fibers held together by an interlocking at their interstices, in a random or directional web or mat through mechanical interlocking, chemical, pressure, thermal fusing or bonding with an adhesion agent.

For the purposes of the present invention, the term "preload" refers to the application of active ingredient or solid bait particles to the pre-coated substrates of any loft, and/or its fibers during the manufacturing or converting process, prior to packaging and sale.

For the purposes of the present invention, the term "substrate" refers to a raw material product or device manufactured from a web forming, preferably highloft, matrix or web forming nonwoven. In most applications the substrate will be made from an inert fiber such as synthetic polymeric fibers, such as rayon, nylon, polyester, poly propylene, fiberglass, ceramic, wadding, fiberfill, plastic, fiber blends, or wood pulp, cellulose fibers or other materials that meet the criteria set forth herein. In some applications, a natural fiber may be used. A highloft nonwoven has a measurable, relatively open, middle interior matrix, or cellular structure, as well as a definite top and bottom. The individual fibers of the substrate are capable of being coated with a cling agent then coated with active ingredient. The substrate can be made primarily of nonwoven but also include other filamentous materials such as fiberglass and plastics. The substrate can also be some of the flat, two sided web forming nonwovens structures dry laid, carded, garneted, wet laid, needle punched, melt blown or compositional not limited to nonwovens.

For the purposes of the present invention, the term "pad" and "entrapment pad" refer to a thin or thick, shaped, cushion like substrate of soft to hard nonwoven materials having a length, width and height. The substrate can be used as carrier with active ingredients incorporated therein or thereon. The pad can have multiple uses particularly when active are incorporated into, throughout, or onto the pad. The pad, or substrate, can be made primarily of high or low loft nonwovens, but also includes fiberglass, varying plastic compositions, basalt, ceramic, fiber blends, wadding, cloth fibers, synthetic wood pulp, or paper. A pad can optionally be used in combination with a backing. The backing can be embossed, water proof, porous, etc.

For the purposes of the present invention, the term "tackifier" refers to composition that is used to modify the rheological properties of an adhesive to maintain it in the non-cured, or tacky, phase. This modification ability is inclusive of pressure sensitive, and non-pressure sensitive adhesives of varying compositions, as well known in the art. The term "tackifier" is also used to refer to the pacified adhesive while the term "tackifier agent" is used to refer to the adhesive modifying agent itself.

In conjunction with and in light of the above definitions and understandings, the best mode for carrying out the invention is presented in terms of its preferred embodiment, herein depicted within the Figures.

The present invention addresses the problems associated with prior art traps directed toward providing for a glueboard and a method of using the glueboard for trapping rodents or other pest on various surfaces while using a smaller adhesive mass.

Referring now to FIG. 3-9, an improved rodent trap is shown and generally noted as 10 according to the preferred embodiment of the present invention. The trap 10 consists of an entrapment pad 12 consist of inexpensive nonwovens, low to high loft, which can be easily converted to a variety of shapes and volumes for products of various categories. The entrapment pad, or substrate 12, can be provided with multiple unique properties, by uniformly distributing and coating active ingredient(s) directly or indirectly throughout the substrate or pad that can release easily when coming in contact with the air or with a target surface. The target can be any type of crawling or flying pest, but for purposes of disclosing a preferred best mode, and not necessarily meant as a limitation, the target can be consider a rodent such as a mouse, rat, chipmunk or other mouse-like or rat-like pest. The active ingredient can be adhered to the substrate and/or fibers via dropping, coating, spraying, either directly to the fibers or indirectly to a secondary carrier that attaches to the pressure sensitive adhesive coated fibers. The addition of the active ingredient may be done either during the manufacture of the pad or during a post manufacture processing.

Figure 3:
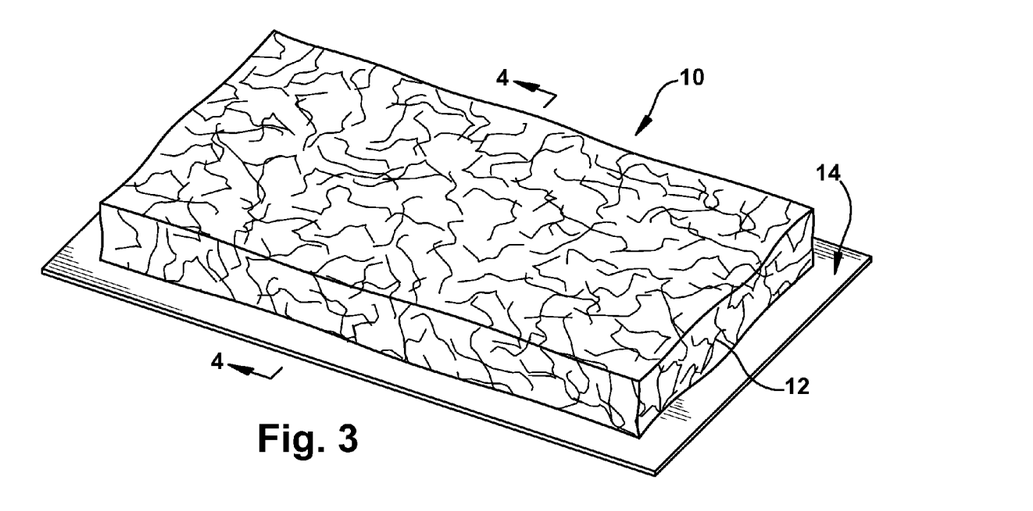
FIG. 3 is a perspective view of an improved pest control trap in accordance with a preferred embodiment of the present invention.
Figure 4:
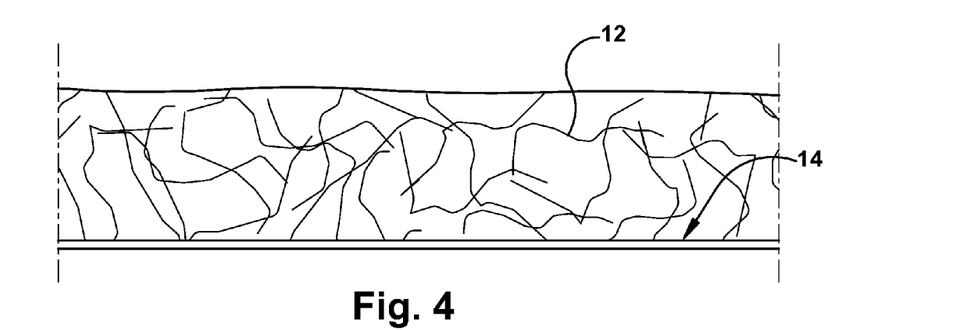
FIG. 4 is a cross-sectional view of a non-woven pad in accordance with an embodiment of the present invention.
Figure 5:
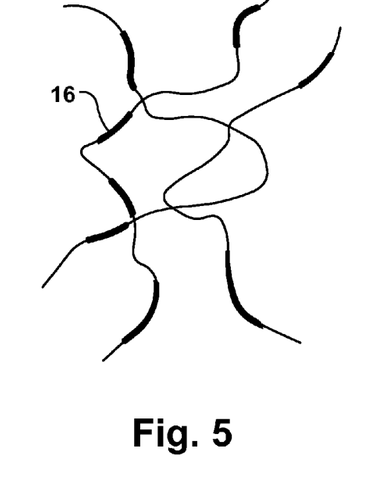
FIG. 5 is a schematic illustration of a fiber coated with an adhesive agent and having active ingredients bonded to the fiber through use of the adhesive agent in accordance with an embodiment of the present invention.
Figure 6:
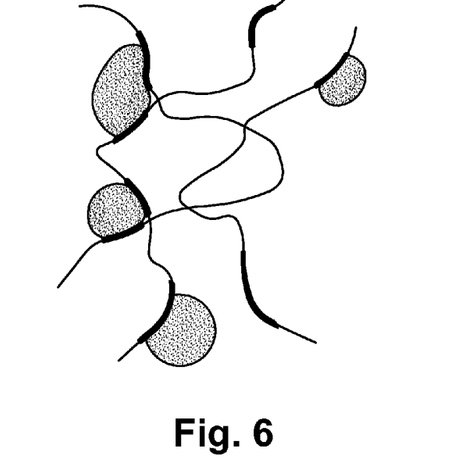
FIG. 6 is a cross-sectional view of a fiber coated with an adhesive substance and having active ingredients bonded to the adhesive in accordance with an embodiment of the present invention.
Figure 7:
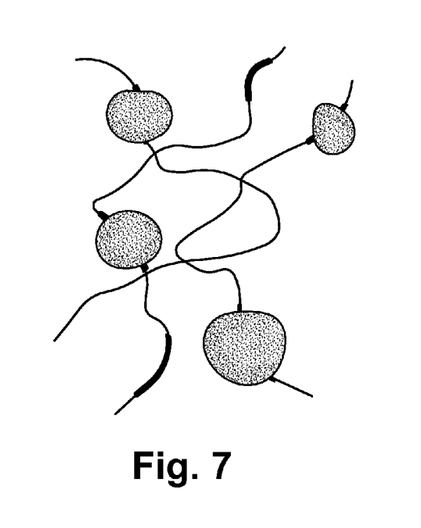
FIG. 7 is a cross-sectional view of a secondary carrier that has adsorbed active ingredients in accordance with an embodiment of the present invention.
Figure 8:
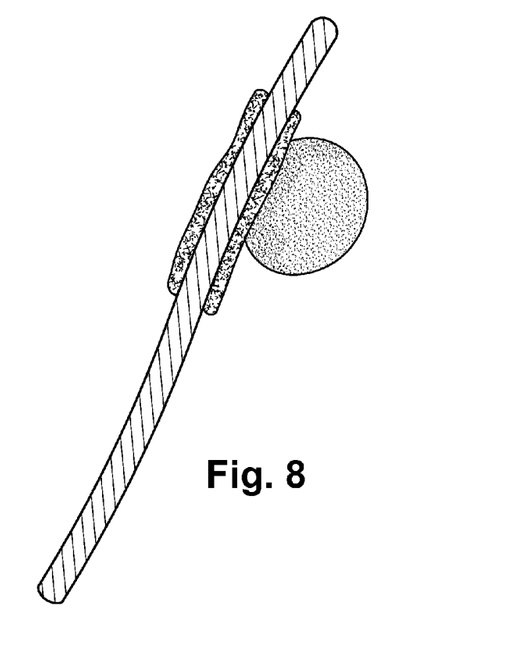
FIG. 8 is a schematic illustration of a fiber coated with an adhesive agent and having the secondary carrier of FIG. 7 bonded to the adhesive agent in accordance with an embodiment of the present invention.

The entrapment pads 12 consist of inexpensive nonwovens, low to high loft, which can easily be made to attract, or entrap, rodents. The substrate 12 is preferably flexible, although it may be rigid. The substrate 12 can be used in conjunction with a glueboard base member 14, such as a shallow tray, as will be described more fully hereafter. However, in other applications, the entrapment pad 12 is shown as a sheet, but it is understood that other configurations may also be used.

A quantity of rodent arresting adhesive 16 is operatively retained within the entrapment pad. The quantity of rodent arresting adhesive is sufficient to restrain movement of a rodent that becomes trapped in the entrapment pad 12. The quantity and type of adhesive, being well known in the art. By way of example, and not as a limitation, the use of H551 permanent pressure sensitive adhesive as provided by Heartland Adhesives and Coatings, Inc. of Germantown, Wis. is exemplary of one type of adhesive that is known to provide the desired functionality required in a manner that is necessarily formable within the desired entrapment pad. More generally, suitable adhesives are most commonly based on natural rubber-, synthetic rubber-(e.g., styrene/butadiene copolymers and styrene/isoprene/styrene block copolymers), and various (meth)acrylate-(e.g., acrylate and methacrylate)

based polymers blended with appropriate tackifiers to render them pressure sensitive. As would be obvious to a person having ordinary skill in the relevant art, in light of the present teachings, any process that would convert an adhesive into a pressure sensitive adhesive would be considered the functional equivalent and therefore be incorporated into the intent and scope of the present invention.

The above specification, examples and data provide a description of the manufacture and use of the composition of the invention. It will be appreciated by those skilled in the art that other components and configurations that embody the principles of this invention and other applications therefore other than as described herein can be configured within the spirit and intent of this invention. The exact arrangements described herein are provided only as examples of embodiments that incorporate the principles and the practices of this invention.

Other modifications to the basic configuration have been anticipated. A securing mechanism to anchor the entrapment pad can be incorporated, such as the use of 3M® double sticky tape or 3M® double sided foam adhesive, or similar attachment mechanisms affixed directly on the entrapment pad. The entrapment pads usually consist of a durable, nonwoven, with or without a backing, containing a rodent arresting hot melt adhesive ingredients. These pads or sections of web forming structure can also be shaped for placement into a specific location. The adhesive ingredients may be loaded into the substrate in any configuration deemed applicable to suit the end application. This distribution can be randomly throughout the substrate as a single placement within the substrate. Specific designs for intended purposes also include loading the adhesive ingredient to a substrate in rows, then apply a second, third, etc, adhesive in another, alternating row. Another coating process could involve loading the nonwoven top with one ingredient separated from another applied to the side.

Rows, either on the surface or in the depth of the substrate, of different active ingredients, or separating the right side from the left, top from bottom, is a technique that is an advantage of using this system. It should be noted that the placement of the active ingredients, either in rows or sections, can be vertical layers, horizontal layers or patchwork and the appropriate application will be evident to those skilled in the art. In a trap for entrapping insects, fleas, ticks, etc. a bait or attractant can be placed in the center of the substrate, with adhesive at the outside perimeter, yielding a silent effective, inexpensive, disposable trap. One skilled in the art will appreciate the non-toxic trap can be used within or without preloaded bait.

The flexible open fiber substrate wipe or pad, etc. can contour to match the shape of a non-planar material, banisters, rails, faucets, etc. With a high loft non-woven, the substrate can contour and the amount of material exposed to the surface being treated, varies with the amount of pressure applied to the pad. Of these web forming structures the air laid, dry laid or wet laid, high loft nonwovens represent a group that have special advantages as a carrier for holding rodent arresting adhesive within the substrate by way of their very open, sturdy, matrix. The high lofts can carry less mass of adhesive while providing the same entrapment capacity due to their inner cellular structure. The adhesive agents can easily coat the interior or these high lofts as compared to other web forming structures such as the carded, needlepunched, gameted, melt blown and others well know to those skilled in the art.

To use the present invention, the designed entrapment pad is created in a desired form factor to provide an efficient capture surface. The form factor can be available in very wide widths, or very narrow widths, with the high loft nonwoven material being easily die cuttable in a high speed manufacturing process of simple complexity. The high loft nonwoven matrix is then used as a substrate for the application of adhesive onto the upper capture surface. The application of adhesive into the matrix can be at a desired depth, such as ⅛ inch to ¼ inch provide a three dimensional capture area as opposed to merely a flat capture surface available in prior art glueboards. Further, the adhesive can be applied using the proven technique of fiberization spray that can be easily adapted to a die cutting assembly line system. Additionally, packaging can be done easily in line as minimal latent heat is generated from the application of the adhesive through spraying. The capture areas increase the actual adhesive contact area even though less volume of adhesive is used. Additionally, the dispose of less material is required when the pad is discarded. The form factor can be adapted for the desired capture location, as well as for the capture of different targeted pests. For flying insects, the matrix can be mounted to a frame designed to be mounted by hanging into open spaces such as, for example, cold barns or other spaces generally attracting flying insect within the dairy production industry. For crawling insects such as cockroaches, an inverted design can be used, or for crawling insects such as grass hoppers or leaf hoppers a flat laid design can be incorporated.

The present invention offers increased adhesion strength and increased adhesive surface area over a prior art trap offering a tacky top surface. In one embodiment of the invention, a pest trap includes a high loft woven material and a three-dimensional application of spaced apart adhesive. The pest trap offers an accumulative adhesion strength as a pest advances from a top surface of the trap toward a bottom surface. In other words, as the pest advances from a front surface of the trap to a back surface of the trap, the pest must produce an increasingly large amount of force to free itself from the trap, that is to say, to overcome the capturing force produced by the trap. The trap offers this feature in a horizontal or a vertical orientation.

Figure 9:
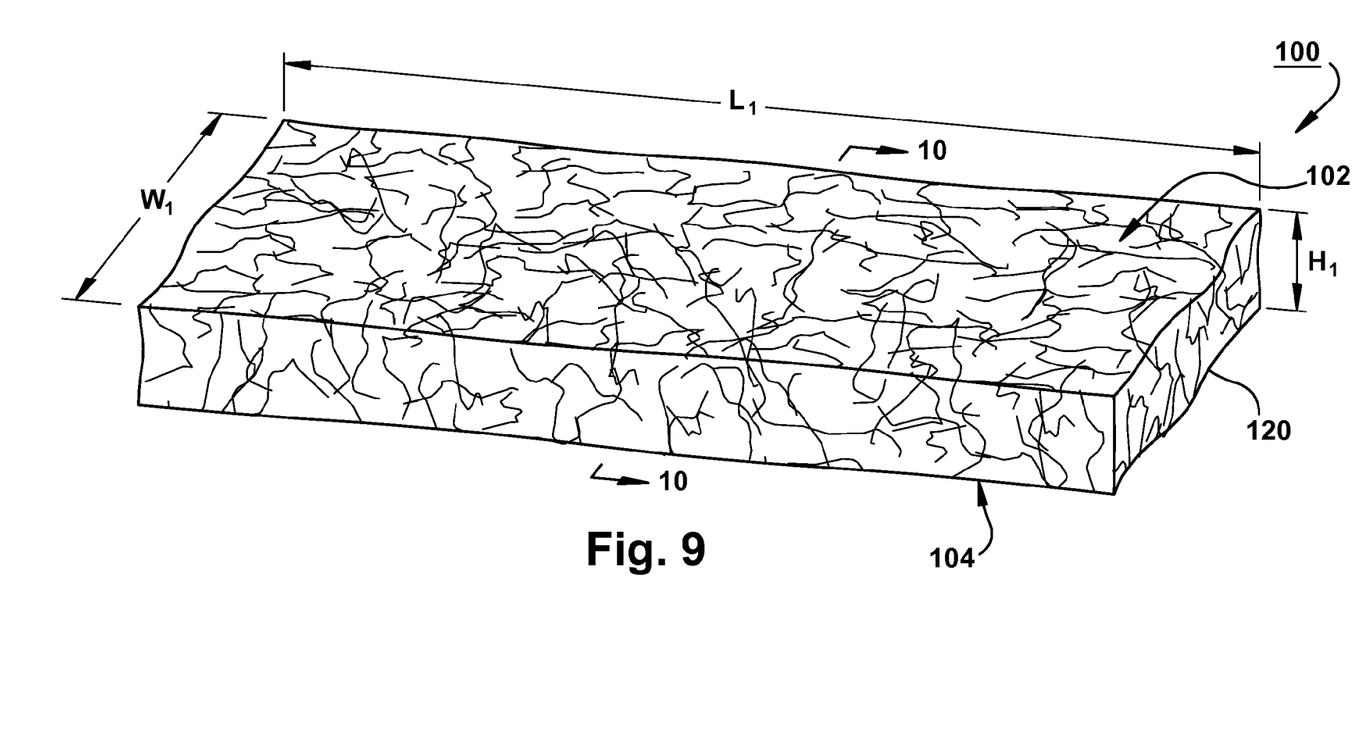
FIG. 9 is a top perspective view of a pest trap.

A top perspective view of a pest trap is shown in FIG. 9. The pest trap 100 includes a pad 120 formed of a highloft nonwoven material. Being constructed from a highloft material, the pad 120 generally has an overall volume filled with more air than fabric. The nonwoven material has a three-dimensional volume defined by a height $H_1$, a width $W_1$, and a length $L_1$. The three-dimensional volume of the pad further defines a three-dimensional capture area for unwanted pests. A top surface 102 of the pad 120 has many pores and has an area generally filled with more air than fabric and is specifically defined by a width $W_1$, and a length $L_1$. A bottom surface 104 has a similar area. In the practice of the invention, the material can be cut into a pad having any suitable shape. The material is generally flexible and can be installed on any planar or non-planar surface.

The three-dimensional pad increases the surface area potential for adhesive. Conventional traps are two dimensional with regard to adhesive placement, which limits the potential surface area that will be exposed to the pest. The matrix structure of the pad offers a larger surface area without increases the footprint of the pad.

High loft nonwoven material is available in several thicknesses and densities, and offers flexibility for various applications. High loft nonwoven material can be sized and arranged to meet a variety of environments and a variety of targeted pests. For example, thicker and denser material can be used for a rat trap, thinner material can be used for a mouse trap, and less dense material can be used for an insect trap.

The use of high loft nonwoven material offers many advantages over typical pest traps. For example, the porous properties of the material allow the trap to function when moisture is present. A trap having a tacky adhesive on the top surface does not function when wet and may permit the pet to simply walk over the top surface of the trap. In the matrix structure of the high loft nonwoven material, the pest may avoid adhesive on top layers of the pad with their feet, but dry fur higher up on their legs may stick after other parts of the pest absorb any excessive water.

The pest trap includes adhesive to capture or arrest unwanted pests, such as for example, rodents, such as mice, rats, or chipmunks, and insects, such as for example, crickets and roaches. The adhesive can be a pressure-sensitive and non-toxic. A quantity of adhesive is disposed throughout the three-dimensional capture area of the pad in a three-dimensional and spaced-apart pattern. One exemplary adhesive application process is a fiberization process. Further, any spray process applying adhesive to a high loft nonwoven material will use less adhesive as compared to a typical pest trap having a single tacky surface.

Figure 10:
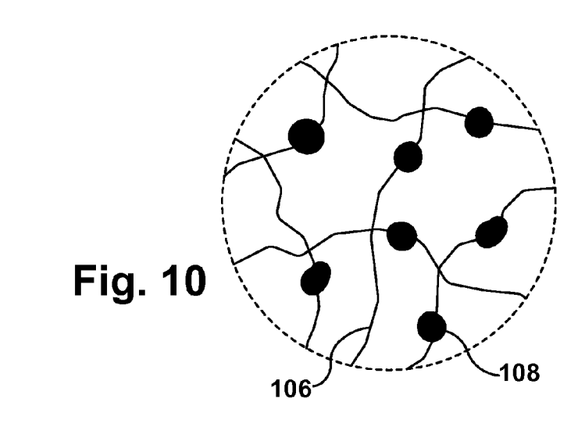
FIG. 10 is an enlarged sectional view of a portion of the pest trap, shown along the line 10-10 of FIG. 9.

An exemplary spaced-apart pattern is illustrated in FIG. 10, which is an enlarged sectional view of a portion of the pest trap 120 and is shown along the line 10-10 of FIG. 9. Each of a plurality of adhesive clumps or balls 108 are shown adhered to one of a plurality of fibers 106. In this view, it is apparent that the three-dimensional matrix structure of the pad offers greater surface for the application of adhesive than a one-surface trap, and as a result, for the capture of a pest. As such, a pest advancing from the top surface 102 toward the bottom surface 104 will contact adhesive remotely disposed at one or more intermediate positions between the top surface and the bottom surface.

The pest trap 120 is arranged to capture a pest when the pest travels over the top surface of the pad. The top surface 102 is not necessarily designed to support the pest, nor is enough adhesive necessarily applied to the top surface alone to capture the pest. Rather, the pest is captured by an accumulation of adhesive contacted by the pest as the pest sinks into the pad. In other words, the strength required by the rodent to free itself from the trap progressively increases as at least a portion of the pest advances through the three-dimensional capture area of the pad in a direction from the top surface toward the bottom surface.

Figure 11:
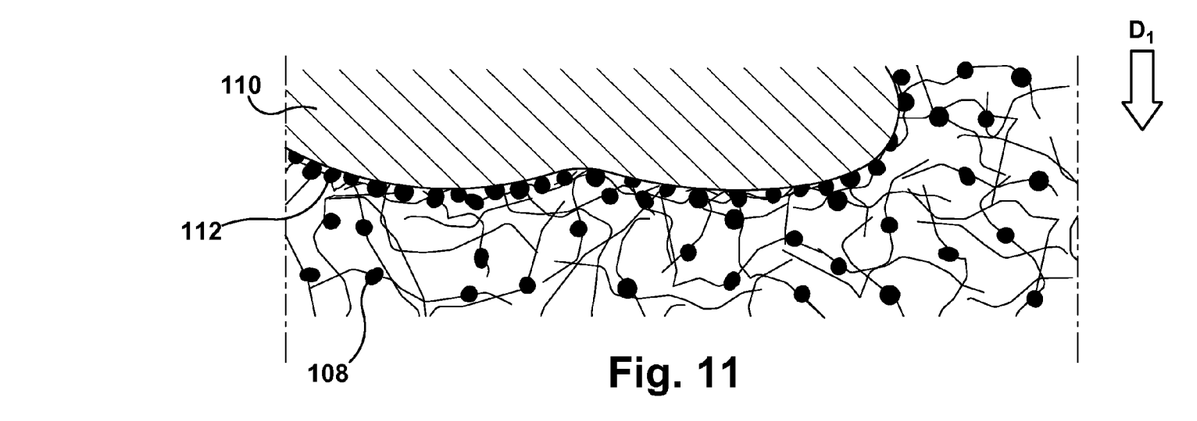
FIG. 11 is an enlarged sectional view of a portion of the pest trap, shown along the line 10-10 of FIG. 9 and with a pest foot advanced into the pest trap.

Referring now to FIG. 11, an enlarged sectional view of a portion of the pest trap is shown with a pest foot sunken into the pest trap. The foot 110 is shown in a position after advancing in the $D_1$ direction from the top surface of the pad 120. An accumulation of individual adhesive clumps 112 is shown attached to or adjacent the foot 110. As shown and positioned, a plurality of adhesive clumps 108 have not yet contributed to the adhesive strength of the pad, but will adhere to the foot if the foot continues to descend into the pad in the $D_1$ direction toward the bottom surface 104 of the pad 120.

In application, the pest trap is not arranged or structured to actively terminate the pest. The trap contains no poisonous or toxic material. A trap is designed to capture a pest traveling across the top surface of the pest. As the pest applied pressure to the top surface, for example, with a foot, the foot will advance into the pad toward the bottom surface of the pad. The amount of adhesive adhering to the pest increases as the pest advances intro the pad. Struggle with one or more feet into the pad to free a single stuck foot progressively increases the adhesive strength of the pad. A captured pest may be discarded by the user.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, circuits, devices and components, software, hardware, control logic, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A pest trap comprising:
a pad formed of a highloft nonwoven material constructed of fibers and defining a three-dimensional capture area of the pad between a top surface and a bottom surface thereof, wherein at least some of the fibers extend in a manner such that they are non-parallel to each other and cross each other; and
a quantity of tacky, non-drying pressure sensitive adhesive disposed throughout the three-dimensional capture area of the pad in a three-dimensional and spaced-apart spray pattern, wherein the quantity of adhesive comprises droplets disposed at discrete locations along the lengths of the fibers;
wherein the accumulation of adhesive from the pad adhering against a pest increases with pest movement in a direction from an initial contact with the top surface of the pad toward the bottom surface.

2. The pest trap of claim 1, wherein the strength required by the pest to free itself increases with pest movement in a direction from an initial contact with the top surface of the pad toward the bottom surface.

3. The pest trap of claim 1, wherein the quantity of pressure sensitive adhesive is sufficient to restrain free movement of a rodent that becomes trapped in the pad.

4. The pest trap of claim 1, wherein the pressure sensitive adhesive is applied through the pad via controlled fiberization spraying of the adhesive.

5. The pest trap of claim 1, wherein the highloft nonwoven material further comprises a highloft nonwoven material matrix of loft depth greater than 1/8".

6. A pest trap comprising:
   a pad formed of a highloft nonwoven material constructed of fibers and defining a three-dimensional capture area of the pad between a top surface and a bottom surface thereof, wherein at least some of the fibers extend in a manner such that they are non-parallel to each other and cross each other; and
   a quantity of tacky, non-drying pressure sensitive adhesive disposed throughout the three-dimensional capture area of the pad in a three-dimensional and spaced-apart spray pattern, wherein the quantity of the adhesive comprises droplets disposed at discrete locations along lengths of the fibers;
   wherein the top surface of the pad has more air than nonwoven material;
   wherein the capture surface area of the pad against a pest increases as the pest advances through the three-dimensional capture area of the pad in a direction from the top surface toward the bottom surface.

7. The pest trap of claim 6 wherein the pest is a rodent.

8. The pest trap of claim 6 wherein the pest is an insect.

9. The pest trap of claim 6 wherein the pest arrested within the pad contacts adhesive remotely disposed at an intermediate position between the top surface and the bottom surface.

10. A pest trap comprising:
    a pad formed of a highloft nonwoven material constructed of fibers and defining a three-dimensional capture area of the pad between a top surface and a bottom surface thereof, wherein at least some of the fibers extend in a manner such that they are non-parallel to each other and cross each other; and
    a quantity of tacky, non-drying pressure sensitive adhesive disposed throughout the three-dimensional capture area of the pad in a three-dimensional and spaced-apart spray pattern, wherein the quantity of the adhesive comprises droplets disposed at discrete locations along lengths of the fibers;
    wherein the top surface of the pad has more air than nonwoven material;
    wherein the capture surface area of the pad against a pest increases with pest movement in a direction from an initial contact with the top surface of the pad toward the bottom surface.

11. The pest trap of claim 10, wherein the quantity of pressure sensitive adhesive is sufficient to restrain free movement of a rodent that becomes trapped in the pad.

12. The pest trap of claim 10, wherein the pressure sensitive adhesive is applied through substrate via controlled fiberization spraying of the adhesive.

13. The pest trap of claim 10, wherein the highloft nonwoven material further comprises a highloft nonwoven material matrix of loft depth greater than 1/8".

\* \* \* \* \*